United States Patent [19]
Hawthorn

[11] Patent Number: 5,423,571
[45] Date of Patent: Jun. 13, 1995

[54] VEHICLE AIR BAG ASSEMBLY

[75] Inventor: Laura A. Hawthorn, Vandalia, Ohio

[73] Assignee: General Motors Corporation, Detroit, Mich.

[21] Appl. No.: 168,244

[22] Filed: Dec. 17, 1993

[51] Int. Cl.6 .............................................. B60R 21/30
[52] U.S. Cl. .................... 280/738; 280/728.3
[58] Field of Search ............... 280/732, 738, 728 B, 280/728 R, 731

[56] References Cited

U.S. PATENT DOCUMENTS

| | | | |
|---|---|---|---|
| 3,938,826 | 2/1976 | Giorgini et al. | 280/150 AB |
| 5,100,172 | 3/1992 | VanVoorhies et al. | 280/738 |
| 5,242,191 | 9/1993 | Faigle et al. | 280/731 |

Primary Examiner—Eric D. Culbreth
Attorney, Agent, or Firm—Charles E. Leahy

[57] ABSTRACT

A vehicle air bag assembly has a housing mounted beneath an opening in a vehicle panel and holding an inflator for discharging gas to inflate an air bag for deployment through the opening. A door normally closes the opening and is forcibly moved out of the opening from a closed position to an open position by the deploying air bag. The housing also includes a plurality of apertures communicable with ambient air. A flap closes the apertures to prevent communication with ambient air so that discharging inflator gas is blocked from escaping out through the apertures and is fully utilized for initial air bag inflation to open the door. A positioning device positions the flap for closing the apertures in the housing. The flap is operatively connected to the door, such as by having an end secured thereto, and is pulled by the opening movement of the door to open the apertures. Upon opening movement of the door by the deploying air bag, ambient air is aspirated in through the apertures to augment the volume of inflator gas delivered to the air bag, and subsequently inflator gas and ambient air may be vented out through the apertures.

3 Claims, 1 Drawing Sheet

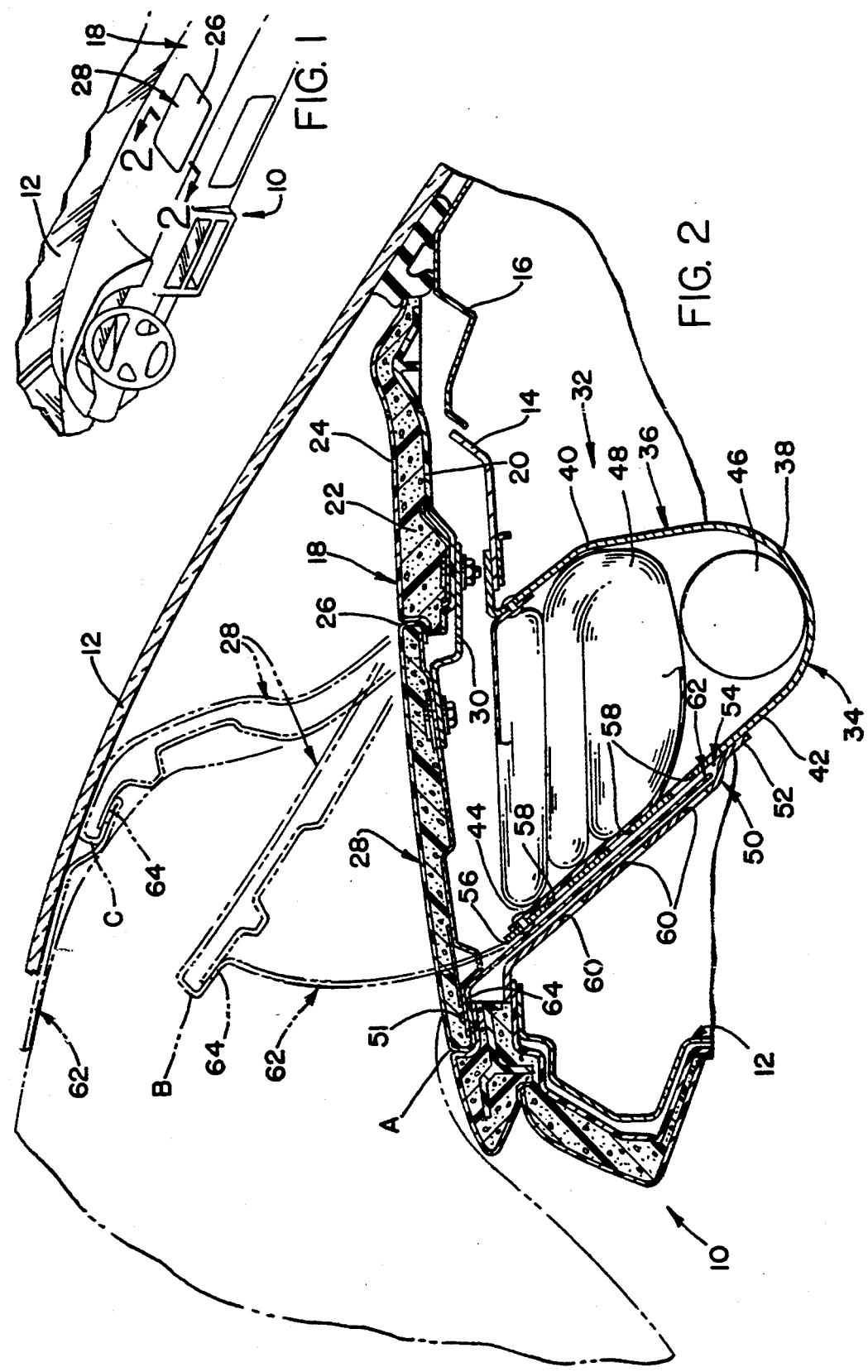

VEHICLE AIR BAG ASSEMBLY

The invention relates to a vehicle air bag assembly including an inflator housing having aspiration apertures therein and an air bag for deployment through an opening in a vehicle panel closed by a door, and more particularly, to an improved air bag assembly in which the apertures are opened for aspiration in response to opening movement of the door.

BACKGROUND OF THE INVENTION

It is well known in motor vehicles to have a vehicle panel, such as an instrument panel, including an air bag deployment opening through which an inflatable air bag is deployed. The opening is typically closed by a door to normally conceal the undeployed air bag from view. A conventional door is hingedly mounted to the vehicle panel and separable therefrom so that the inflating air bag forcibly moves the door out of the opening to permit deployment of the air bag through the opening.

An air bag assembly includes a housing mounted beneath the opening in the instrument panel and an inflator for discharging gas to inflate the air bag. Upon the vehicle experiencing a predetermined deceleration, the inflator discharges gas so that: the air bag forcibly opens the door and suddenly deploys through the opening. This sudden deployment of the air bag, causes a rapid pressure drop in the housing as the air bag deploys faster than the inflator can discharge gas.

The prior art teaches that the housing may include aspiration apertures therein which are continuously open for communication with ambient air. Thus, the pressure drop in the housing causes ambient air to be aspirated in through the apertures to augment the volume of inflator gas delivered to the air bag. Inflator gas may also be vented out through these open apertures as necessary.

However, the continuously open apertures may permit inflator gas to escape out through the apertures during initial air bag inflation, thereby reducing the inflator gas available to open the door. To compensate for this reduction, an uploaded inflator which discharges greater amounts of inflator gas may be needed, thereby adding cost to the air bag assembly.

The prior art discloses that a closure device, such as a flexible flap attached to the air bag or the air bag itself, may be used to close she apertures to block inflator gas from escaping out through the apertures. The pressure of the inflator gas maintains the closure device against the wall of the housing to cover the apertures during initial air bag inflation. As the air bag deploys out of the housing, the apertures are opened to permit aspiration of ambient air. By using the flexible flap attached to the air bag or the air bag itself as a closure device, the opening of the apertures is completely in response to the movement of the air bag as it inflates.

Thus, it would be desirable to provide an improved air bag assembly in which the apertures are closed when the door is in the closed position, and in which the apertures are opened in response to opening movement of the door, rather than inflation of the air bag, to maximize aspiration of ambient air in through the apertures to augment the volume of inflator gas delivered to the air bag as enabled by the pressure drop in the housing.

SUMMARY OF THE INVENTION

According to the invention, a vehicle air bag assembly has a housing mounted beneath an opening in a vehicle panel and holding an inflator for discharging gas to inflate an air bag for deployment through the opening. A door normally closes the opening and is forcibly moved out of the opening from a closed position to an open position by the deploying air bag. The housing also includes a plurality of apertures communicable with ambient air. A flap closes the apertures to prevent communication with ambient air so that discharging inflator gas is blocked from escaping out through the apertures and is fully utilized for initial air bag inflation to open the door. The flap is operatively connected to the door and is pulled by the opening movement of the door to open the apertures. Upon opening movement of the door by the deploying air bag, ambient air is aspirated in through the apertures to augment the volume of inflator gas delivered to the air bag, and subsequently, inflator gas and ambient air may be vented out through the apertures.

In accordance with another aspect of this invention, the flap has an end secured to the door and is suspended downwardly therefrom. The housing may comprise a wall having a panel attached thereto and spaced apart therefrom to cooperatively define a pocket which opens subjacent the door. The wall and panel both have a plurality of apertures. The wall and panel cooperatively position the flap within the pocket for closing the apertures. The flap is pulled completely out of the pocket by the opening movement of the door to open the apertures.

Accordingly, it is an object, feature and advantage of this invention to provide an air bag assembly having a housing with aspiration apertures which are closed when the door is in the closed position to block discharging inflator gas from escaping out through the apertures to thereby fully utilize the inflator gas for initial air bag inflation to open the door, and yet in which the apertures are opened in response to opening movement of the door to maximize aspiration of ambient air in through the apertures to augment the volume of inflator gas delivered to the air bag as enabled by a pressure drop in the housing caused upon air bag deployment and to subsequently permit venting of inflator gas and ambient air out through the apertures as necessary.

BRIEF DESCRIPTION OF THE DRAWINGS

These and other features, objects, and advantages of the present invention will become apparent upon consideration of the following description of the preferred embodiment, appended claims, and accompanying drawings in which:

FIG. 1 is a perspective view of a vehicle interior having an instrument panel assembly including a door closing an air bag deployment opening; and FIG. 2 is a section view taken as indicated along line 2—2 of FIG. 1 showing the door in the solid line indicated closed position A, in the phantom line indicated partially open position B, and in the phantom line indicated open position C.

DESCRIPTION OF THE PREFERRED EMBODIMENT

Referring to FIG. 1, it is seen that a passenger vehicle includes an instrument panel assembly 10 mounted in a vehicle interior rearward of a windshield 12. As shown in FIG. 2, the instrument panel assembly 10 includes sheet metal stampings 12, 14, 16 which are suitably welded and fastened to provide supportive vehicle structure to support the instrument panel assembly 10. The upper surface of the instrument panel assembly 10 comprises an instrument panel cover 18 constructed of a substrate layer 20 for supporting a foam padding layer 22 having a decorative skin 24 thereon.

Referring to FIGS. 1 and 2, a generally rectangular air bag deployment opening 26 is formed in the instrument panel cover 18 and is normally closed by a door 28 having a construction similar to that of the instrument panel cover 18, such that the door 28 provides an aesthetically pleasing closure of the opening 26. The door 28 is hingedly mounted to the instrument panel cover 18, such as by a hinge strap 30, and is separably secured to the instrument panel cover 18, as is well known in the art.

As shown in FIG. 2, an air bag assembly 32 includes a housing 34 mounted beneath the opening 26 in the instrument panel cover 18 and supported sheet metal stampings 12, 14. The housing 34 includes a steel reaction canister portion 36 having a transversely extending substantially U-shaped cross section and comprised of a curved bottom wall 38 integrally connected to an upstanding forward wall 40 and rearward wall 42 being closed by parallel end walls (not shown). The forward wall 40, rearward wall 42 and end walls define a generally rectangular gas discharge opening 44 positioned subjacent the opening 26 in the instrument panel cover 18.

The canister 36 of the housing 34 holds an inflator 46 for discharging gas through the gas discharge opening 44 to inflate an air bag 48 upon the vehicle experiencing a predetermined rate of deceleration. The inflator 46 may be of any conventional design, but preferably has gas discharge ports (not shown) which direct discharging gas upwardly towards the gas discharge opening 44.

The inflatable air bag 48 is normally stored in the canister 36 of the housing 34 in a folded condition and has a periphery secured to the gas discharge opening 44 in a conventional manner.

The housing 34 further includes an outer panel 50 located rearwardly of the rearward wall 42 and having a lower end portion 52 connected thereto. The rearward wall 42 and outer panel 50 are substantially parallel and are spaced apart to cooperatively define a pocket 54 having a pocket opening 56 subjacent the free rearward end of the door 28. The rearward wall 42 and outer panel 50 have a plurality of aspiration apertures 58 and 60, respectively, therein for communicating ambient air into the housing 34. The apertures 58 in the rearward wall 42 are spaced apart from and preferably directly opposing the apertures 60 in the outer panel 50.

A flexible flap 62 has an end 64 secured to the door 28, such as by fastening onto the bottom of the door 28 by rivets 51. When the door 28 is in the closed position A, the flap 62 is suspended downwardly from the door 28 into the pocket 54 and is seated between the rearward wall 42 and outer panel 50 so that the flap 62 is interposed between the apertures 58, 60.

Thus, the rearward wall 42 and outer panel 50 cooperatively position the flap 62 within the pocket 54 for closing the apertures 58, 60 to prevent communication with ambient air when the door 28 is in the closed position A. The flap 62 may be made of any impervious material, but is preferably made of a flexible cloth material similar to that of a conventional air bag.

Upon actuation, the inflator 46 rapidly discharges inflator gas towards the gas discharge opening 44 of the housing 34 so that pressure is exerted on the air bag 48 which in turn applies pressure against the bottom of the door 28. During initial inflation of the air bag 48, and prior to opening of the door 28, the flap 62 is forced away from the rearward wall 42 by discharging inflator gas. The outer panel 50 restrains the flap 62 and maintains the flap 62 in position within the pocket 54 for closing the apertures 60 and blocking discharging inflator gas from escaping out through the apertures 60 in the outer panel 50 so that inflator gas is fully utilized for initial air bag 48 inflation to open the door 28.

The air bag 48 suddenly deploys when the air bag 48 applies a predetermined pressure to the door 28 and moves the door 28 from the solid line indicated closed position A to the phantom line indicated open position C, as shown in FIG. 2. The flap 62 is rapidly pulled out of the pocket 54 by the opening movement of the door 28 so that the apertures 58, 60 are opened for communication with ambient air. It is seen that when the door 28 is in a partially open position B, the flap 62 has been sufficiently moved by the door 28 to fully open the apertures 58, 60. It is also seen that in the open position C, the flap 62 is restrained against the windshield 12.

The sudden deployment of the air bag 48 through the opening 26 in the instrument panel cover 18, causes a rapid pressure drop within the housing 34 as the air bag 48 deploys faster than the inflator 46 can discharge gas. This pressure drop aspirates ambient air in through the apertures 58, 60 to augment the volume of gas delivered to the air bag 48. The open apertures 58, 60 also subsequently permit venting of the mixture of inflator gas and ambient air out through the apertures 58, 60 as necessary, such as upon the air bag 48 prematurely encountering an obstruction during deployment or upon deactuation of the inflator 46 after full deployment of the air bag 48.

It will be appreciated that since the flap 62 is secured to the door 28, the flap 62 progressively, but rapidly, begins opening the apertures 58, 60 immediately in response to the opening movement of the door 28 so that the advantage of ambient air aspiration is maximized during the pressure drop in the housing 34 caused by opening movement of the door 28 upon deployment of the air bag 48. It will also be appreciated that since the flap 62 blocks inflator gas from escaping out through the apertures 60 to fully utilize inflator gas during initial air bag inflation to open the door 28, a downloaded inflator 46 with a decreased capacity for discharging gas may be utilized while maintaining reliability in opening of the door 28.

Thus, it is seen that this embodiment of the invention provides an improved air bag assembly 32 in which the apertures 58, 60 are closed when the door 28 is in the closed position A to block discharging inflator gas from escaping out through the apertures 60 to fully utilize the inflator gas for initial air bag 48 inflation to open the door 28, and yet in which the apertures 58, 60 are opened in response to opening movement of the door 28 to maximize aspiration of ambient air in through the apertures 58, 60 to augment the volume of inflator gas delivered to the air bag 48 as enabled by the pressure drop in the housing 34, and to subsequently permit venting of inflator gas and ambient air out through the apertures 58, 60 as necessary.

It will be understood that a person skilled in the art may make modifications to the preferred embodiment shown herein within the scope and intent of the claims. For example, although the preferred embodiment provides an outer panel 50 and a rearward wall 42 for positioning the flap 62 to close the apertures 58, 60 from communication with ambient air when the door 28 is in the closed position A, it will be appreciated that other positioning devices may also be utilized. Although one flap 62 and one outer panel 50 is shown in the preferred embodiment, it will be understood that a plurality of flaps and a plurality of panels may be provided depending on the arrangement of apertures in the housing 34. It will also be appreciated that the outer panel 50 or other device for positioning the flap 62 may be connected to vehicle structure other than the canister 36.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. In a vehicle air bag assembly having a housing mounted beneath an opening in a vehicle panel and holding an inflator for discharging gas to inflate an air bag for deployment through the opening, and a door normally closing the opening and being forcibly moved out of the opening from a closed position to an open position by the deploying air bag, the improvement comprising:

the housing comprising at least one wall having a panel attached thereto and spaced apart therefrom to cooperatively define a pocket which opens subjacent the door, the wall and panel having a plurality of apertures;

a flap means having an end secured to the door and being suspended downwardly therefrom;

the wall and panel cooperatively positioning said flap means within the pocket for closing the apertures to prevent communication with ambient air when the door is in the closed position so that discharging inflator gas is blocked from escaping out through the apertures and is fully utilized for initial air bag inflation to open the door;

and said flap means being pulled completely out of the pocket by the opening movement of the door to open the apertures;

whereby upon opening movement of the door by the deploying air bag, ambient air is aspirated in through the apertures to augment the volume of inflator gas delivered to the air bag, and subsequently inflator gas and ambient air may be vented out through the apertures.

2. The improvement of claim 1 further characterized by apertures in the wall being directly opposed to the apertures in the panel.

3. The improvement of claim 2 wherein the door has a hinged end and an opposite free end and the pocket opens subjacent the free end of the door.

* * * * *